Sept. 15, 1970  R. J. BOEDIGHEIMER  3,528,702
LINEAR RETRACTOR
Filed Oct. 4, 1968  2 Sheets-Sheet 2
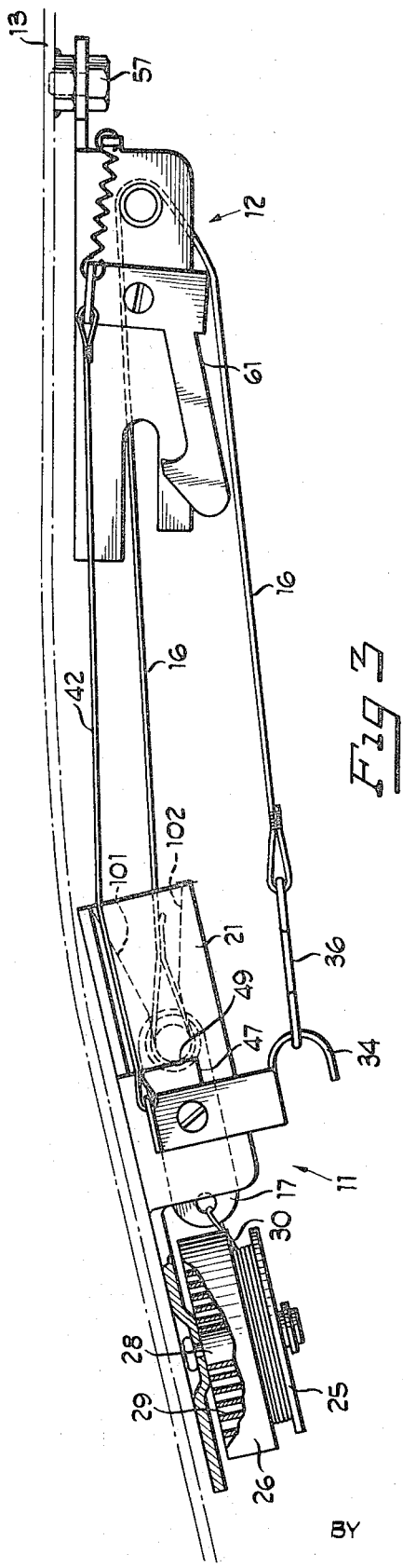
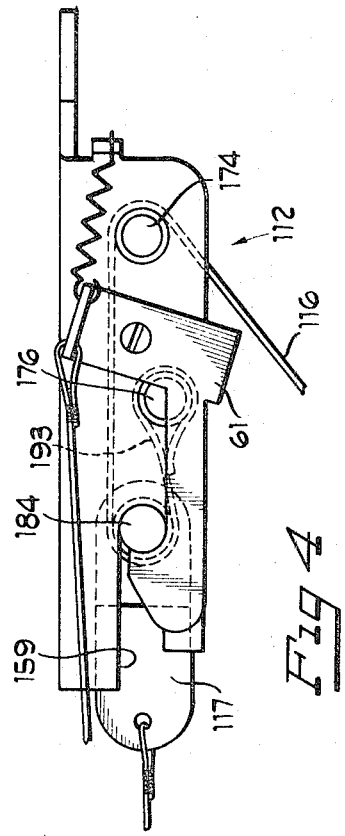
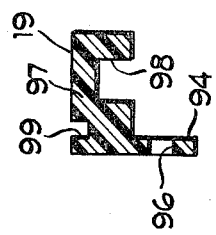
INVENTOR
RAYMOND J. BOEDIGHEIMER
BY
ATTORNEY Harman E. Smith

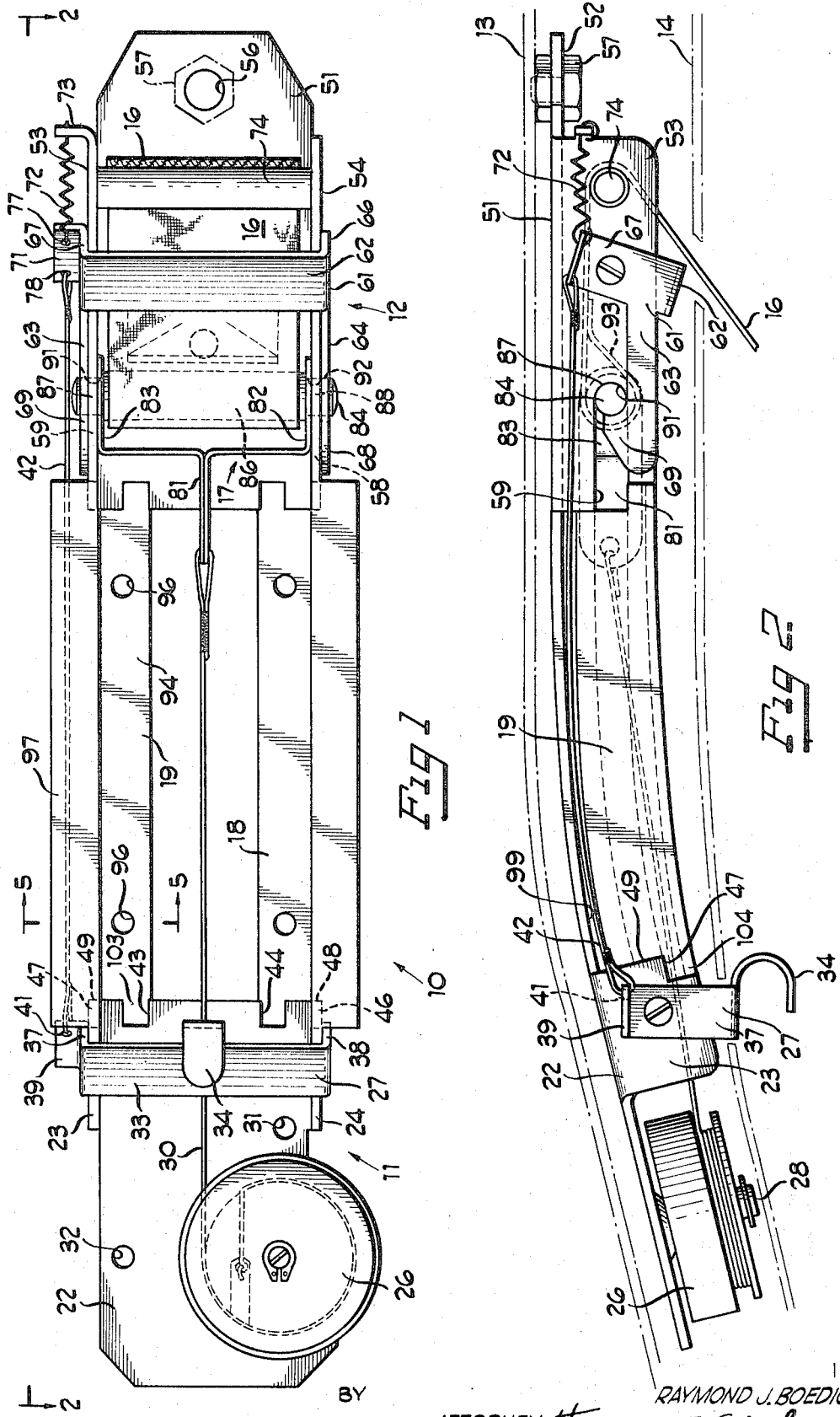

United States Patent Office 3,528,702
Patented Sept. 15, 1970

3,528,702
LINEAR RETRACTOR
Raymond J. Boedigheimer, Chicago, Ill., assignor to Borg-Warner Corporation, Chicago, Ill., a corporation of Delaware
Filed Oct. 4, 1968, Ser. No. 765,225
Int. Cl. A62b *35/02;* B65h *75/48*
U.S. Cl. 297—388                  7 Claims

ABSTRACT OF THE DISCLOSURE

A belt storage apparatus for retracting a diagonal over the shoulder type safety belt, has a thin elongated configuration for overhead mounting between the roof and head liner of a vehicle and includes remotely operated latching means for removing retracting tension from the body of the user when in service.

SUMMARY OF THE INVENTION

The present invention relates generally to safety belt storage apparatus and more particularly to such apparatus for storing a length of belt in a shallow elongated configuration.

The use of safety belts in automotive vehicles, particularly the use of shoulder harness for supporting the upper torso of a vehicle occupant, has introduced problems in handling the belt while not in service, so as to avoid interference with the driver's view and interfere with entrance to or exit from the vehicle.

An object of the present invention is to provide retracting apparatus for storing safety belt in a compact shallow elongated configuration when not in service. A further object of the invention is to provide apparatus for retracting safety belt into the head liner of the vehicle when not in service, and a still further object is to provide elongated retracting apparatus adapted for mounting on a curved mounting surface. Other objects and advantages of the invention will become apparent to those skilled in the art from consideration of the following description together with the drawings.

BRIEF DESCRIPTION OF THE DRAWINGS

FIG. 1 is a plan view of a retractor apparatus according to the present invention;

FIG. 2 is an elevation view of the apparatus, viewed along the arrows 2—2 of FIG. 1;

FIG. 3 is a view similar to FIG. 2 showing an alternate form of the invention;

FIG. 4 is a fragmentary elevation view showing a modification of a portion of the belt storage apparatus; and FIG. 5 is a fragmentary section view taken along line 5—5 of FIG. 1.

DESCRIPTION OF THE PREFERED EMBODIMENTS

Referring now to the drawings and more particularly to FIG. 1 thereof, the reference character 10 indicates safety belt storage apparatus having a shallow elongated configuration suitable for mounting between the head liner 14 and roof 13 of a motor vehicle. Belt storage apparatus 10 includes a retractor unit 11 and an anchor unit 12 adapted for mounting at spaced loactions on the roof portion 13 of a motor vehicle. The retractor and anchor units are arranged for mounting on either a curved surface or a flat surface in order to facilitate mounting of the belt storage apparatus in a wide variety of vehicle models. A safety belt 16 has one end thereof looped about a portion of a belt carrier 17 which is adapted for movement between the anchor unit 12 and retractor unit 11. In one form of the invention as shown in FIGS. 1 and 2, a pair of rails 18, 19 extend between anchor unit 12 and retractor unit 11, defining guide means for guiding the movement of belt carrier 17 during translation between the anchor and retractor units. In another form of the invention as shown in FIG. 3, an extension member 21 provides means for guiding the movement of belt carrier 17 into alignment with retractor unit 11. Additional guide means may be employed for guiding belt carrier 17 into alignment with anchor unit 12 if desired, however, the construction of anchor unit 12 is such that alignment of the belt carrier may be achieved without the use of additional guide means.

Referring now in more detail to the retractor unit 11, a channel form frame member 22, having upstanding wall portions 23, 24 provides a base on which is mounted a tensioning member 26 and a remote latch operator 27. Tensioning member 26 includes a reel 25 rotatably mounted on stud like spindle 28. A spring motor 29 is connected between reel 25 and spindle 28 urging rotation of reel 25 in the counterclockwise direction as viewed in FIG. 1. A flexible strand 30 is connected between reel 25 and belt carrier 17 urging the belt carrier toward the retractor unit.

The web portion of frame 22 is provided with a pair of mounting apertures 31, 32 disposed near the edges thereof providing means for securing the retractor unit to a portion of a vehicle as by cap screws or the like. The web portion also includes a pair of notches 43, 44 facilitating alignment of rails 18, 19 or extension member 21 with retractor unit 11. The wall portions 23, 24 of frame 22 define shoulders 46, 47 and stop surfaces 48, 49. The shoulders provide additional means for aligning flexible rails 18, 19 or extension member 21 with the retractor unit 11 while the stop surfaces 48, 49 provide an abutment means for limiting movement of belt carrier 17 toward retractor unit 11.

Remote latch operator 27 is of U-shaped configuration including a transverse bar portion 33 from which extends the hook portion 34. The configuration and disposition of hook portion 34 will vary in accordance with the configuration of the tongue 36 of a belt clasp with which it is engaged when belt 16 is not in service. Latch operator 27 includes a pair of arm members 37, 38 pivotally mounted on the wall portions 23, 24 of frame member 22. Arm member 37 has a lateral extension 39 including an aperture 41 facilitating the connection of an operating cord 42.

Referring now in more detail to anchor unit 12, a channel-form frame member 51 includes a base portion 52 and a pair of side wall portions 53, 54. Base portion 52 includes a mounting aperture 56 adapted to receive a fastener such as a cap screw 57 for securing the anchor unit 12 to the vehicle frame 13. Each of the side walls 53, 54 includes a slot 58, 59 providing a receptacle for receiving belt carrier 17. A releasable latch member 61 includes a transverse bar portion 62 extending between a pair of side portions 63, 64. Each side portion includes an arm 66, 67 and a latch bar 68, 69. Each arm 66, 67 is pivotally mounted on a respective side wall 53, 54 of anchor unit 12. Arm 67 has a lateral extension 71 including a pair of apertures 77, 78 affording means for connecting latch member 61 to one end of the operating cord 42 and one end of spring 72. An extension 73 of side wall 53 provides means for connecting the other end of spring 72 to the frame 51 of anchor unit 12.

A transverse rod 74, extending between and supported in side walls 53, 54 serves as a belt orienting and supporting means. A bight portion of belt 16 is looped about transverse rod 74, one leg of the bight portion extending generally parallel to the base portion 52 of frame 51 while the other leg of the bight portion extends downwardly at an angle for use by a vehicle occupant as shown in FIG. 2 or toward the remote latch operator 27 as shown in FIG. 3. A modified form of anchor unit 112 is shown in FIG. 4, being similar to anchor unit 12 with the exception that two transverse rods 174, 176 are employed. In either anchor unit 12 or 112, the transverse rod 74 or rods 174, 176 assist in orienting belt 16 substantially parallel with the base portion of the frame which in turn assists in orienting belt carrier 17 or 117 for alignment with the receptacle 59 or 159.

Belt carrier 17 includes cross bar 84 and yoke 81. Crossbar 84 includes a belt receiving portion 86 extending between a pair of supporting portions 87, 88. Each supporting portion 87, 88 is received through a respective aperture 91, 92 in the spaced leg portions 82, 83 of yoke 81. In addition each of the supporting portions 87, 88 is receivable within respective slot-like receptacles 58, 59 in anchor unit side walls 53, 54. The supporting portions 87, 88 are also engageable with respective latch bars 68, 69 for selectively retaining the belt carrier in the anchor unit. In the embodiment of the invention shown in FIGS. 1, 2 and 3, belt 16 is provided with a loop portion 93 which embraces the belt receiving portion 86 of crossbar 84. In the modified form of anchor unit shown in FIG. 4, the belt 116 includes a loop portion 193 which embraces the second transverse rod 176 while a bight portion of the belt extends around the crossbar 184 and the other transverse rod 174.

Guide means for guiding the movement of belt carrier 17 or 117 is provided in the form of rails 18, 19 in the embodiment of FIGS. 1 and 2, and in the form of the extension member 21 in the embodiment of FIG. 3. Flexible rail 19 is typical of rail 18 and has features common to extension member 21. As shown particularly in FIGS. 1, 2 and 5, rail 19 includes a base portion 94 provided with one or more mounting apertures 96 for receiving fasteners such as cap screws. The wall 97 of rail 19 includes a slot 98 having surfaces defining a passage for guiding the movement of supporting portion 87 of the belt carrier. If desired, a channel 99 may be provided in wall 97 for guiding operating cord 42. Preferably, rails 18, and 19 are of similar construction providing passages for guiding the movement of the belt carrier through engagement with the supporting portions 87, 88. Rails 18, 19 may be straight or curved depending upon the surface on which the belt storage unit is to be mounted. In a preferred form of the invention, rails 18, 19 are formed of an elastomeric material, imparting a measure of flexibility, facilitating mounting of the belt storage unit on a variety of surfaces. The construction of an extension member 21 is similar to a rail in which the guide slot includes converging surfaces 101, 102. Both the extension member and the rails may be provided with projections such as 103, 104 for aligning the guide means with the retractor and anchor units of the belt storage device. Extension members such as 21 may be employed with both the retractor unit 11 and anchor unit 12 if desired, however, the belt in cooperation with the transverse rods 74 or 174, 176 exert an aligning bias on the belt carrier as it approaches the anchor unit, whereas the center connected flexible strand 30 may permit twisting or turning of the belt carrier as it approaches the retractor unit.

OPERATION

When it is desired to employ the belt in a safety restraining position, the belt 16 and clasp tongue 36 are removed from the hook 34 and pulled downwardly across the upper torso of a vehicle occupant for connection with a mating portion of the belt buckle. As the belt and tongue are pulled downwardly, the belt carrier is moved from the retractor unit toward the anchor unit overcoming the bias of the spring motor 29. Upon movement of the belt carrier into the receptacle portion of the anchor unit, the latches 68, 69 engage the supporting portions 87, 88 of the belt carrier locking the carrier against return movement toward the retractor unit. Latching the belt carrier to the anchor unit thus isolates the biasing force of the tension member 26 from the belt 16, permitting the occupant to adjust the belt to a desired length. Isolating the biasing force from the belt permits slack in the belt avoiding the annoyance of constant pressure on the body of the occupant.

When it is desired to remove the belt from occupant restraining position, the tongue 36 is removed from the buckle and restored to the hook 34. Movement of hook 34 results in pivotal movement of latch operator 27 which in turn disengages latch member 61 from the belt carrier by means of the operating cord 42. When latch member 61 is disengaged from the belt carrier, the tensioning member 26 again exerts a retraction bias on the belt carrier through the flexible strand 30, resulting in movement of the belt carrier toward the retraction unit. The belt carrier is moved into engagement with the stop surfaces 48, 49 such that the belt 16 is stored along the roof of the vehicle as shown in FIG. 3, in a position avoiding interference with both vision and entrance or exit to and from the vehicle.

The modified form of anchor unit and belt carrier shown in FIG. 4, provides for more compact storage of the belt inasmuch as the belt carrier 117 travels only half the distance for a given extension of the belt 116. The operation of anchor unit 112 and belt carrier 117 is similar to the operation of anchor unit 12 and belt carrier 17 with the exception that the end loop 193 of belt 116 remains stationary in anchor unit 112 while a bight of the belt moves around cross bar 184 during extension and retraction of the belt.

While a preferred form of the invention has been shown and described together with modifications thereof, it is to be understood that further variations and modifications thereof are included within the spirit of the invention and the scope of the following claims.

What is claimed is:

1. Safety belt storage apparatus including a retractor unit and an anchor unit longitudinally spaced from each other, having a belt carrier member adapted to move forward and back between said retractor unit and anchor unit;

said carrier member including supporting means and a belt receiving portion adapted to receive a bight portion of a belt;

said anchor unit including receptacle means adapted to receive said carrier member, and having releasable latch means engageable with said carrier member for securing said carrier member in said receptacle means;

said retractor unit including stop means engageable with said carrier member and having a tension member mounted thereon, said tension member including an extensible and retractable flexible strand connected to said carrier member urging said carrier member toward said stop means; and guide means disposed adjacent said stop means, engageable with said supporting means for guiding said carrier member toward engagement with said stop means in response to retractile movement of said flexible strand.

2. Safety belt storage apparatus according to claim 1 in which said guide means includes a surface extending from said retractor unit toward said anchor unit defining a passage converging toward said stop means.

3. Safety belt storage apparatus according to claim 1 in which said guide means includes a flexible rail member engageable with said supporting means extending between said retractor unit and said anchor unit.

4. Safety belt storage apparatus according to claim 1 in which said retractor unit includes a remote latch operator member connected to said latch means, actuatable to provide disengagement of said latch means from said carrier member for permitting movement of said carrier member toward said retractor unit.

5. Safety belt storage apparatus according to claim 1 in which said carrier member includes a pair of spaced supporting portions defining said supporting means, said belt receiving portion extending between said spaced supporting portions, said guide means including a pair of flexible rail members extending between said retractor unit and anchor unit, each of said rails including a slot engageable with respective supporting portions of said carrier member for guiding said carrier member into alignment with said receptacle means and said stop means during movement thereof forward and back between said anchor unit and retractor unit.

6. Safety belt storage apparatus according to claim 5 in which a yoke member is connected to said carrier member having a pair of spaced legs spanning said belt receiving portion connected to said pair of spaced supporting portions, said yoke providing means for connecting said flexible strand to said carrier member substantially in alignment with a mid point of said belt receiving portion.

7. Safety belt storage apparatus according to claim 1 in which said anchor unit includes orienting means arranged and disposed adjacent said receptacle means effective to guide said carrier member into alignment with said receptacle during movement of said carrier member toward said anchor unit.

References Cited

UNITED STATES PATENTS

| 2,886,259 | 5/1959 | Barecki | 242—107.4 |
| 3,371,960 | 3/1968 | Bayer et al. | |
| 3,400,977 | 9/1968 | Jones | 297—389 X |
| 3,439,932 | 4/1969 | Lewis et al. | 297—389 X |
| 3,459,440 | 8/1969 | Hopka et al. | 297—388 X |

FOREIGN PATENTS

| 1,054,245 | 1/1967 | Great Britain. |
| 1,097,178 | 12/1967 | Great Britain. |

JAMES T. McCALL, Primary Examiner

U.S. Cl. X.R.

242—107.4; 297—389